United States Patent [19]

Jones, Sr.

[11] 4,430,278

[45] Feb. 7, 1984

[54] PROCESS FOR INCREASING THE PERMEABILITY OF PLASTIC MEMBRANE

[76] Inventor: John L. Jones, Sr., 1070 Glen Oaks Blvd., Pasadena, Calif. 91105

[21] Appl. No.: 344,293

[22] Filed: Feb. 1, 1982

[51] Int. Cl.$^3$ .............................................. B29D 27/00
[52] U.S. Cl. ...................................... 264/22; 264/41; 264/558; 264/564
[58] Field of Search ..................... 264/22, 25, 26, 558, 264/564, 41, DIG. 43, DIG. 17, DIG. 47, 456; 201/2.5; 210/640, 642, 645, 650, 651, 652, 653, 654, 655; 219/10.41, 10.55 R, 10.69

[56] References Cited

U.S. PATENT DOCUMENTS

| 2,979,777 | 4/1961 | Goldman | 264/558 |
| 3,121,760 | 2/1964 | Kline | 264/558 |
| 3,812,224 | 5/1974 | Smith et al. | 264/DIG. 17 |
| 4,076,656 | 2/1978 | White et al. | 106/122 |

FOREIGN PATENT DOCUMENTS

| 2375515 | 12/1976 | France | 264/26 |

OTHER PUBLICATIONS

Rubber and Plastics Age, vol. 44, No. 5, May 1963, p. 525 "Microwave Power for Fast Curing".
SPE Journal, vol. 24, Nov. 1968, pp. 29-32, "Plastics-Microwaves Pros and Cons".

*Primary Examiner*—Donald E. Czaja
*Assistant Examiner*—Mary A. Becker
*Attorney, Agent, or Firm*—J. L. Jones, Sr.

[57] ABSTRACT

The regulated permeability of a thermoplastic membrane is modified by subjecting the thin membrane sheeting to warm to hot water, increasing the absorption of water in the membrane. The membrane is then rapidly heated with microwave radiation energy, typically at the 2450 MHz frequency absorbed by water, or heated in hot air. The water molecules absorbed in the membrane are explosively boiled out of the membrane, increasing the porosity of the membrane to water and also to other small molecules dissolved in water. The permeability of the plastic membrane is controlled by varying the concentration of water molecules initially absorbed in the hot membrane. Several types of plastic membrane having a relatively higher water absorption can be treated. The thin plastic membrane can be manufactured by extruding a small diameter, thick wall plastic tubing into hot water, and expanding the tubing with a hot water stream pumped into the inside of the tubing. The thin plastic sheet membrane can also be prepared by stretching a thicker plastic membrane in hot water. The hot water in which the plastic membrane is immersed can also contain small volatile, water-soluble molecules, such as methanol, ethanol, propropanol, and acetone, which can increase the permeability to selected small molecules of the plastic membrane on boiling out the solvent. Salt molecules of sodium chloride (NaCl), magnesium chloride ($MgCl_2$), and the like in a hot water solution can form micro crystals in the thin-wall plastic membrane, which can be dissolved out at room temperature, further increasing the controlled permeability of the plastic membrane.

12 Claims, 2 Drawing Figures

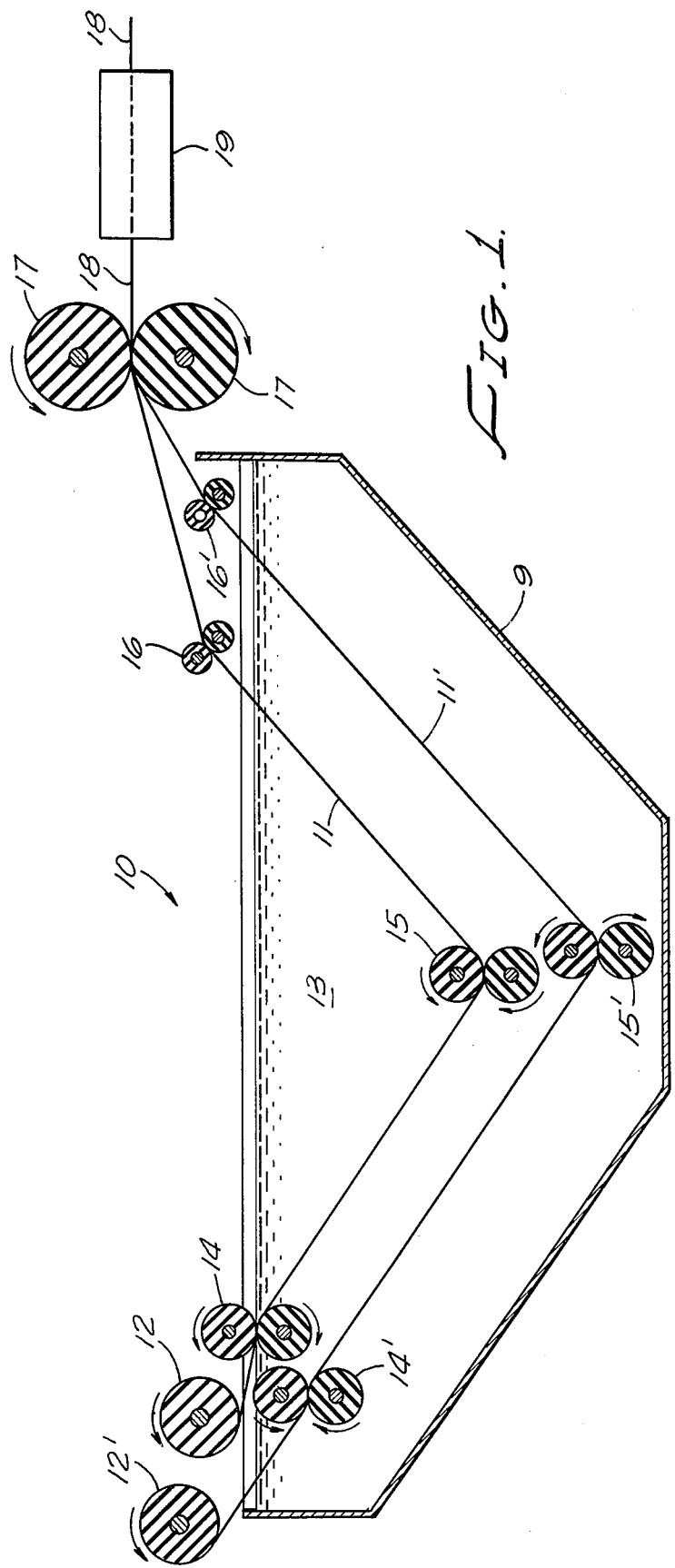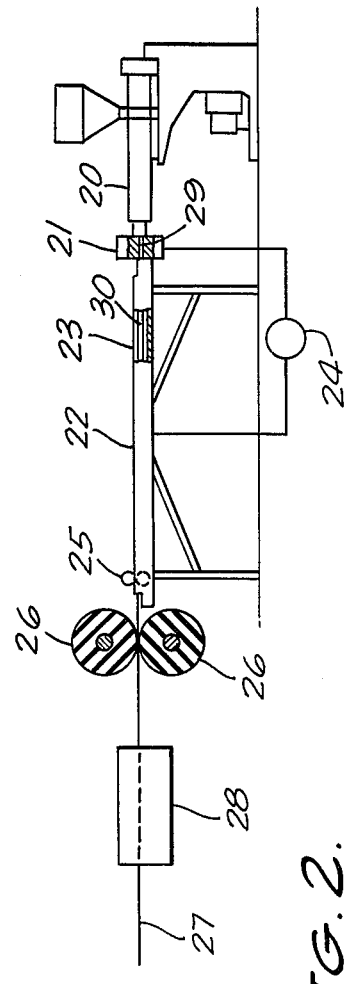

PROCESS FOR INCREASING THE PERMEABILITY OF PLASTIC MEMBRANE

CROSS REFERENCE TO RELATED APPLICATIONS

This application is related to the following patent applications filed earlier, and now pending:

U.S. patent application, Ser. No. 098,321 filed Dec. 10, 1979 for Manufacturing Blood Perfusion Units, by J. L. JONES, SR., U.S. continuation patent application, Ser. No. 243,522, Mar. 13, 1981, by Earle E. Newhart (deceased).

BACKGROUND OF THE INVENTION

The increased permeability of selected plastic membrane of this invention is classified in Class 210, subclasses 640, 650, 651, 653, 654, 655, 645, 642.

The permeability of thermoplastic membrane to molecules of chemical compounds dissolved in water and to water can be increased by chemically modifying the plastic composition, and also by physically modifying the thermoplastic membrane structure. There are diffusional application needs for requiring selected chemical molecules to migrate through barrier thermoplastic membrane. Other diffusional application needs must provide for diffusion of selected molecules, including water flow across the barrier membrane. The presence of liquid water on one face of the plastic membrane can complicate and change the permeability of gases such as $CO_2$ and $O_2$ through plastic membrane, due to intermolecular attraction and absorbtion of water molecules in the plastic membrane.

The rate of molecular transport through a plastic membrane is a function of at least two factors: the chemical structure of the diffusing molecule and the molecular state of the plastic membrane, glassy or rubbery.

The integral artificial kidney unit disclosed, taught and claimed in U.S. Pat. No. 4,173,537 issued Nov. 6, 1979, requires that a blood perfusion unit be fabricated from a thermoplastic composition membrane having a high permeability to the waste product excreta molecules which must be removed from the blood of uremic patients.

Cellulose acetate, in both hollow fiber form and membrane form, has been deacetylated to provide a cellulose type structure having improved permeability to a selected molecular weight range including water, as compared to the original cellulose acetate composition.

A regenerated cellulose membrane is regenerated from a cuproammonium cellulose, forming a thin film structure. The regenerated cellulose membrane is utilized, due to the permeability of the membrane to a range of molecular weights, including water. The regenerated cellulose membrane is not a thermoplastic composition.

In U.S. Pat. No. 4,265,745 issued May 5, 1981, Kawaguchi et al disclose a perma-selective membrane comprising a thin film of a polymeric material prepared by cross linking a polyaddition product between a polyepoxy compound and a polyamino compound having at least two amino groups capable of reacting with epoxy groups with a polyfunctional compound selected from the group consisting of aromatic, hetrocyclic and alicyclic compounds containing at least functional groups selected from acid halide, sulforyl halide, isocyanate and acid anhydride groups, and a process for producing the same. The membrane of this invention is especially useful for desalination of saline or brackish water.

In U.S. Pat. No. 4,263,017 issued Apr. 21, 1981, Kara discloses a permeable membrane utilizing a bi-leaf edge membrane concept and the lay-flat tubing connector concept. The above concepts are shown and claimed in transfer systems including selective transfer in general, including selective transfer of gaseous fluids and liquid fluids, as well as heat transfer.

Marze disclosed in U.S. Pat. No. 4,207,182 issued June 10, 1980, a mixture of at least one non-sulphonated polysulphone and at least one sulphonated polysulphone, this mixture having 10 to 30% by weight of sulphonated polysulphone having a theoretical exchange capacity of from 500 to 1,200 meq/kg.

Popovich, Antiviler and Moncrief in U.S. Pat. No. 4,191,182 issued Mar. 4, 1980, disclose a process and apparatus for continuously separating blood into plasma and cellular component fractions, and returning the latter to the subject in admixture with a makeup fluid, employing a membrane ultrafilter.

Credali and Parrini, in U.S. Pat. No. 3,696,031 issued Oct. 3, 1972, disclose and teach a reverse osmosis process utilizing a semi-permeable membrane polyamide comprising the reaction product of a piperozine with a dicarboxylic acid or acid anhydride.

SUMMARY OF THE INVENTION

A thermoplastic composition membrane is selected from the class of thermoplastic compositions having a water permeability ($PH_2O$) of at least 1000., in units of $(cc \times cm \times 10^{10}/sq. cm \times sec \times cmHg)$ at standard temperature and pressure. Typical unplasticized thermoplastic compositions of this class are cellulose acetate, polystyrene, polycarbonate (the reaction product of bis-phenol A and phosgene), poly (2, 6 dimethyl phenylene oxide), poly dimethyl siloxane, and the like polymers. The thermoplastic composition membrane is equilibrated in direct water contact in a water bath whose bath temperature is substantially above room temperature, varying up to 100° C.

The wetted and temperature equilibrated membrane can be then stretched as by continuously stretching the membrane web between an opposed pair of pressure squeeze roller sets, the second or downstream roller set providing a higher liner web speed than the first or upstream roller set. The amount of web stretching and equivalent web thickness reduction is a function of the web linear velocity at the first and second set of pressure rollers. The web absorbs water during the stretching process in the hot water bath. The web is typically stretched to a web thickness of approximately 0.00254 cm.

Alternatively, a thermoplastic granule composition can be extruded in a conventional plastic extruder as a continuous length of tubing, having an initial 0.50 cm OD × 0.05 cm thick wall. The tubing is immediately expanded on leaving the extruder die by a regulated continuing volume of regulated temperature hot water, of water solution, injected into the interior of the plastic tubing resting in a hot water bath. The hot plastic tubing is expanded by the regulated volume of hot water into a controlled circular thin-wall tubing having a circular diameter of about 9.5 cm and a plastic wall thickness of about 0.0025 cm. During the expansion of the plastic tubing, the thinning plastic tubing wall is immersed in and absorbs the water, or the water solution. The thin-wall plastic tubing is saturated with the hot water, or hot water solution, by immersing the plastic tubing in a heated water trough for a regulated time period. The thin-wall lay-flat plastic tubing is then squeezed dry in a pair of heated squeeze rolls, and then heat sealed into a fluid perfusion unit configuration in accordance with the disclosure of this inventor's earlier pending invention disclosed in U.S. Ser. No. 098,321. The fusible heat sealed web can then immediately be subjected to microwave radiation energy whose frequency is strongly absorbed by water, such as 2450 MHz. The absorbed water in the web sheeting boils out of the sheeting, traversing and enlarging the sub-microscopic voids in the stretched membrane as the water vapor escapes from the hot membrane faces.

The size of the sub-microscopic voids in the membrane can be altered and controlled by regulating the temperature of the water, or the water solutions in which the plastic tubing is immersed during the tubing expansion process. The permeability of the thin wall plastic tubing can also be regulated by providing water solutions of molecules larger than $H_2O$, such as methanol ($CH_3OH$), ethanol ($C_2H_5OH$), isopropanol (($CH_3$)$_2CHOH$), acetone ($CH_3COCH_3$), and the like. Such aqueous solutions can provide connecting larger sub-microscopic voids in heating and evaporating the water solutions with 2450 MHz microwave, properly coupled with the aqueous compositions. Simple, non-toxic molecules such as NaCl, $MgCl_2$ and the like can also be dissolved in the water to provide voids of controlled volumes on the re-solution of the NaCl crystals from the thin wall plastic membranes in a diffusional operational step.

As an alternative step to immediately subjecting the fusibly stretched web to microwave radiation, the fusibly stretched web can be subjected to temperatures below 0° C., the freezing point of water. The stretched web, frozen below 0° C., is then subjected to microwave radiation whose frequency is strongly absorbed by frozen water, such as 2450 MHz or the like. The water vapor evaporates out of the freeze dried web. The water absorbed in the stretched web expands on freezing, and on boiling out of the web leaves larger sub-microscopic voids in the stretched membrane.

Volatile molecules having molecular weights (MW) larger than the MW=18 of water, such as $CO_2$, MW=44, can be dissolved in the water bath to provide a larger molecular void on evaporation of the absorbed water.

Included in the objects of this invention are:

To provide a plastic composition sheeting permeable to molecules of selected molecular weights required to be removed from the blood of a uremic patient by a kidney dialysis procedure.

To provide a plastic composition membrane having a medically adequate permeability to the middle molecular weight range of 300 to 3000 MW waste excreta products required to be removed from a uremic patient's blood.

To provide a process for increasing the permeability of selected plastic composition membranes which are useful in diffusional separation of NaCl, $MgCl_2$, $CaCl_2$ from brackish water, producing potable drinking water by reverse osmosis.

To provide a process for increasing the permeability of a polycarbonate composition sheeting, providing an increased permeability of the processed sheeting to migration of waste excreta molecules of uremic patients' blood through the processed sheeting on kidney dialysis, as compared to the permeability of unprocessed polycarbonate sheeting.

To provide a process for increasing the permeability of a cellulose acetate composition sheeting, providing an increased permeability of the processed sheeting to diffusion of selected molecules through the processed sheeting by reverse osmosis process.

Other objects and advantages of this invention are taught in the following description and claims.

BRIEF DESCRIPTION OF THE DRAWINGS

The description of this invention is to be read in conjunction with the following drawings:

FIG. 1 is an elevation sectional view of the membrane stretching and aqueous soaking apparatus of this invention, producing increased membrane permeability.

FIG. 2 is an elevational view of the extrusion tubular membrane forming, aqueous soaking apparatus of this invention, producing increased membrane permeability.

DESCRIPTION OF THE PREFERRED EMBODIMENT OF THE INVENTION

The regulated permeability of the selected plastic composition membranes listed in Table I to water molecule diffusion, and to the diffusion of selected molecules such as urine excreta molecules occurring in the blood of uremic patients, can be modified by the processes outlined in Tables II and III.

TABLE I

| Plastic Material | Permeability $P_{H2O}$ | d | $T_g$(°C.) |
|---|---|---|---|
| Polyacrylonitrile | 300. | 1.20 | 104 |
| Polystyrene | 1,200 | 1.05 | 100, 105 |
| Polycarbonate | 1,400 | 1.2 | 150 |
| Cellulose acetate (2,3) (unplasticized) | 6,800 | 1.23 | 120 |
| Polydimethyl siloxane | 40,000 | | −123 |

$P_{H2O}$ = In units: cc × cm × $10^{10}$/sq cm × sec × cm Hg at STP
d = g/ml.
$T_g$ = temperature of transition from lower coefficient of expansion to a higher coefficient When small molecules permeate through a polymer membrane, the rate of permeation can be expressed by parameters which may be characteristic of the polymer. The general concept of the ease with which a permeant passes through a barrier is often referred to as permeability. The general term permeability does not refer to the mechanism of the permeation process and in the literature, the rates of transmission in several different units are often cited as permeability. The permeability constant varies with the morphology of polymers and depends on many other physical factors such as density, degree of crystallinity, degree of orientation, etc. The chemical structure of a polymer can be considered as the predominant factor which controls the magnitude of the permeability constant. The general trends in permeability are related to some influencing factors listed below.

Density can be regarded as a measure of looseness of the polymer structure and, in general, the lower the density the higher the permeability. Molecular weight of a polymer has been found to have little effect on the permeability of polymer, except in the very low range of molecular weights. Crystallinity of a semi-crystalline polymer reduces the permeability significantly from the value of the corresponding amorphous polymer, i.e., the higher the degree of crystallinity, the lower the permeability. Orientation of polymer molecules reduces the permeability.

TABLE II
FLOW SHEET for WATER PERFUSION UNIT MANUFACTURE (1) Pull selected composition plastic thick membrane into controlled temperature tank of hot water, forming heated membrane continuously.
(2) Pass the thick membrane through opposed sets of paired squeeze rollers, the linear web speed of the first set of rollers and the second faster linear speed of the second set of rollers operating at a speed ratio corresponding to the required membrane stretching ratio, immersed in a controlled temperature tank of water.
(3) Saturate the thin wall plastic membrane with controlled temperature hot water, in a tank.
(4) Squeeze surplus water off the plastic membrane, using squeeze rolls.
(5) Continuously heat-seal two membrances into multiple water perfusion units pattern, using a pair of matching rotating heated sealing rolls.
(6) Boil the water out the multiple heat-sealed water perfusion units, utilizing a microwave heating unit at 2450 MHz energy input.
(7) Cut the multiple water perfusion units into the correct single length.

TABLE III
FLOW SHEET for BLOOD PERFUSION UNIT MANUFACTURE (1) Extrude selected composition plastic through die into controlled temperature tank of hot water solution, forming plastic tubing continuously.
(2) Pump controlled temperature hot water solution into inside of plastic tubing at extrusion die, expanding and regulating outside diameter of plastic tubing and forming 0.001 inch thick tubing wall in hot water solution.
(3) Saturate the thin wall plastic tubing with controlled temperature hot water solution, in a tank.
(4) Squeeze surplus solution off layflat plastic tubing, using squeeze rolls.
(5) Continuously heat-seal layflat tubing into multiple blood perfusion units pattern, using a pair of matching rotating heated sealing rolls.
(6) Boil the water out of the multiple heat-sealed water perfusion units, utilizing a microwave heating unit at 2450 MHz energy input.
(7) Cut the multiple blood perfusion units into the correct blood number of units.

As outlined in Table II and data illustrated in FIG. 1, the stretching film apparatus 10 depicts the thin plastic film membrane as first formed 11, 11', as by stretching. A thick membrane 12, 12' (0.013 cm thick or the like) in hot water, or a water solution 13 is disposed in a tank 9 between an opposed pair 14, 14' and 15, 15' of pressure squeeze roller sets, the second unidirectional downstream roller set 15, 15' providing a higher linear web speed than the first or upstream roller set (14, 14'). The amount of plastic web stretching and equivalent web thickness reduction is a function of the web linear velocity at the first 14, 14' and second set 15, 15' of pressure rollers. The plastic web absorbs water or water solution 13 during the stretching process in the hot water and water solution bath 13. The stretched plastic web is finally typically 0.0025 cm thick and saturated or nearly saturated with hot water 13 and hot water solution, during the stretching stage. The water squeeze roll pairs 16 and 16' provide pressure squeezing, reducing the adhering hot water and solutions 13 from the stretched membrane 11, 11', prior to sealing the pair of membranes according to the disclosure and teachings of applicant's U.S. Ser. No. 098,321, as by paired sealing roll patterns of rolls 17, forming the perfusion unit 18. The hot water 13 and hot water solution 13 is then quickly vaporized from the perfusion unit 18 by passing 18 through a microwave oven 19, emitting 2450 MHz frequency strongly absorbed by water.

Alternatively, the selected thermoplastic granule composition of Table I can be extruded (Table III) in a conventional plastic extruder 20 as a continuous length of tubing 29, having an initial 0.50 cm O.D.×0.05 cm thick wall, extruded from a die 21 into a regulated temperature of a hot water bath 22. Through the tubing die 21, a regulated continuing volume of regulated temperature water 23 is injected by a pump 24 into the hot plastic tubing interior, expanding the hot plastic tubing from 0.5 cm or the like O.D. to typically 9.5 cm OD tubing 30 and a plastic wall thickness of 0.0025 cm. During the expansion of the small plastic OD tubing 29 the thinning plastic tubing wall is immersed in and absorbs the hot water 23 or the hot water solution, including the dissolved solute molecules disposed in a heated water bath 22 for a regulated time period. The thin-wall lay-flat plastic tubing 30 is then squeezed dry in a pair of heated squeeze rolls 25 and then heat sealed in another pair of patterned heat seal rolls 26 into a perfusion unit 27 in accordance with this inventor's disclosure and teachings in U.S. Ser. No. 098,321.

The fused heat sealed web can then immediately be subjected to a microwave radiation heater 28 whose energy frequency is strongly absorbed by water, such as 2450 MHz. The absorbed water in the web sealed unit is rapidly evaporated out of the sealed unit 27, traversing and enlarging the sub-microscopic voids in the stretched and sealed unit as the water vapor escapes from the plastic faces, finally increasing the permeability of the web sealed plastic unit to water, and to other selected size molecules, as will be later explained.

Accepting Tg as the glass transition temperature which represents the temperature at which a substantial free molecular volume begins to form, allowing free molecular motion, Tg also can represent the temperature at which significant water absorption can begin to occur in the molecular voids. By immersing the thin plastic films in hot water or hot aqueous solutions of selected volatile solutes, the plastic films are solvated at elevated temperatures. On subjecting the solvated plastic films to microwave frequency energy absorbed by the water and the solvents, the volatile water and other solvents are rapidly evaporated out of the thin plastic film, without unduly heating and shrinking the plastic films, forming microporous voids or channels in and through the plastic film.

If the voids and channels are properly sized in effective diameter these voids and channels through the plastic films can effectively separate water molecules (MW=18) in a diffusion process from the higher molecular weight solutes dissolved and suspended in the water. Thus, with one selectively sized set of voids and channels formed in a plastic film, purified water can be diffusionally separated from brackish water and the like.

With another set of selectively sized set of voids and channels of larger diameter in a plastic film, a diffusional process can separate the normal and abnormal urine excreta products of a human in an extracorporeal blood purification process, as a routine hemodialysis process.

Hot aqueous solutions of volatile solvents, such as 1–5 weight % of methanol, ethanol, isopropanol, and acetone can be used in the aqueous absorption fluid, to effectively increase the void and channel diameter above that formed by hot water.

Dissolved solutes such as sodium chloride (NaCl), urea $CO(NH_2)_2$, uric acid $C_5H_4N_4O_3$, glucose $(C_6H_{12}O_6)$, sodium phosphate $Na_3PO_4$ can be dissolved in warm to hot water to form 1–5 weight % aqueous solutions which can serve as absorption fluids for solution in the thin plastic films as the films are extruded and soaked in the aqueous solutions. The water is flashed out the films, as by microwave irradiation, leaving the selected non-volatile solute molecules crystallized in the film. Since the selected non-volatile solutes are all readily soluble in water, they quickly dissolve in the water or dialysate solution in use, leaving large controlled diameter size voids and channels in the thin film. The films containing crystallized selected non-volatile salts can thus be useful for hemodialysis and the like separation of large molecular weight molecules from human blood.

Many modifications in the process and apparatus for increasing the permeability of plastic membranes can be made in the light of my teachings. It is understood that within the scope of the claims, the invention can be practiced otherwise than as described.

I claim:

1. A process useful in increasing the permeability of a thermoplastic composition membrane to waste excreta molecules of human urine, comprising:

forming a thick wall, small diameter tube by extruding a thermoplastic composition, free of plasticizer, through a tubing die, disposing said tube in a water solution bath having a controlled temperature above room temperature, said water solution bath containing waste excreta crystalline molecules found in human urine, continuously injecting said controlled temperature water solution from said water bath into said tubing die and then into the plastic tubing interior at a water solution volume flow rate cooperating with the plastic tubing formation rate, causing tubing expansion into a thin wall membrane having a wall thickness not more than 0.005 cm, as the membrane tubing remains immersed in said water solution bath, said membrane tubing expansion being controlled to provide a selected outside stretched tubing membrane diameter, maintaining the stretched membrane in said controlled temperature water solution bath for a controlled time period, providing saturation of the membrane, removing said stretched membrane from said water bath and removing excess surface water from said stretched membrane, and, irradiating said stretched membrane with microwave energy of the frequencies absorbed by water molecules in said stretched membrane, providing a more microporous membrane with increased permeability to waste excreta human urine chemical molecules found in human urine.

2. A process useful in increasing the permeability of a thermoplastic composition membrane to selected chemical molecules, comprising:

forming a thick wall, small diameter tube by extruding a thermoplastic composition, free of plasticizer, through a tubing die, disposing said tube in a aqueous solution bath having a specific concentration of solvents selected from methanol, ethanol, propanol, isopropanol, and acetone disposed in said water bath, said aqueous solution having controlled aqueous solution temperature, said aqueous solution having a temperature not less than the equivalent to the glass transition temperature (Tg) of the thermoplastic composition, continuously injecting aforesaid controlled temperature aqueous solution from said solution bath into said tubing die and then into the plastic tubing interior at a solution volume flow rate cooperating with the plastic tubing formation rate, causing tubing expansion into a thin wall tubing having a wall thickness not more than 0.005 cm, as the tubing remains immersed in said solution bath, said tubing expansion controlled to provide a selected stretched outside tubing membrane diameter, maintaining the stretched membrane in said controlled temperature aqueous solution bath for a controlled time period, at a temperature providing saturation of the membrane with said aqueous solution, removing said stretched membrane from said aqueous solution bath and removing excess surface solution from said stretched membrane, and, irradiating said stretched membrane with microwave energy of the frequencies absorbed by the absorbed solution molecules disposed in said stretched membrane, vaporizing said aqueous solution out of said stretched membrane, providing a more microporous membrane with increased permeability to small molecular weight chemical molecules.

3. A process useful in increasing the permeability of a thermoplastic composition membrane to selected chemical molecules, comprising:

forming a thick wall, small diameter tube by extruding a thermoplastic composition, free of plasticizer, through a tubing die, disposing said tube in a water solution bath having said solution disposed at a controlled temperature above room temperature, said solution containing non-volatile and volatile solute molecules selected from the class consisting of methanol, ethanol, propanol, isopropanol, acetone, sodium chloride, lithium chloride, potassium chloride, sodium carbonate, potassium carbonate, calcium chloride, magnesium sulfate, said water solution bath adaptively adjusted in composition to provide an aqueous soluble solution bath, continuously injecting said controlled temperature water solution from said water bath into said tubing die and then into the plastic tubing interior at a water volume flow rate cooperating with the plastic tubing formation rate, causing tubing expansion into a thin wall membrane having a wall thickness not more than 0.005 cm, as the membrane tubing remains immersed in said water solution bath, said membrane tubing expansion being controlled to provide a selected outside tubing diameter, maintaining the stretched membrane in said controlled temperature water solution bath for a controlled time period, at a temperature providing saturation of the membrane with said water solution, removing said stretched membrane from said water solution bath, and removing excess surface water solution from said stretched membrane, then immediately irradiating said stretched membrane with microwave energy of the frequencies absorbed by the absorbed water molecules disposed in said stretched membrane, vaporizing said water and any volatile solutes out of said stretched membrane, providing a more microporous membrane with increased permeability to selected small chemical molecules.

4. A process useful in increasing the permeability of a thermoplastic composition membrane to selected chemical molecules, comprising:

forming a thick wall, small diameter tube by extruding a thermoplastic composition, free of plasticizer, through a tubing die, disposing said tube in a water bath having water disposed at a controlled temperature above room temperature, continuously injecting said controlled temperature water from said water bath into said tubing die and then into the plastic tubing interior at a water volume flow rate cooperating with the plastic tubing formation rate, causing tubing expansion into a thin wall tubing membrane having a wall thickness less than 0.005 cm, as the membrane tubing remains immersed in said water bath, said membrane tubing expansion being controlled to provide a selected outside tubing diameter and membrane thickness, maintaining the stretched membrane in said controlled temperature water bath for a controlled time period, providing saturation of the membrane with said hot water in a controlled time period, removing said stretched membrane from said water bath and removing excess surface water from said stretched membrane, and, irradiating said stretched membrane with microwave energy of the frequencies absorbed by the water molecules disposed in said stretched membrane, vaporizing said water out of said stretched membrane, providing a more microporous membrane with increased permeability to small molecular weight molecules.

5. A process useful in increasing the permeability of a thermoplastic composition membrane to selected chemical molecules, comprising:

stretching a membrane of a thermoplastic composition, free of plasticizer, along one to two axes of orientation of said membrane, said membrane being immersed in a water bath at a controlled water temperature above room temperature during the stretching step, said stretching reducing the thickness of said membrane from at least a prior 0.015 cm to less than 0.005 cm thickness, said stretched membrane having absorbed water, maintaining the stretched membrane in said controlled temperature water bath for a controlled time period providing saturation of the membrane with said hot water, removing said stretched membrane from said water bath, and removing excess surface water from said stretched membrane, and, then immediately irradiating said stretched membrane with microwave energy of the frequencies absorbed by the water molecules disposed in said stretched membrane, vaporizing said water out of said stretched membrane, providing a more microporous membrane with increased permeability to small molecular weight molecules.

6. In the process of claim 5, after removing said excess surface water from said stretched membrane, the further improvement comprising:

the step of immediately subjecting the absorbed water disposed in the stretched membrane to a temperature at least as low as 0° C., thereby freezing the absorbed water in said stretched membrane, and, irradiating aforesaid frozen water in said stretched membrane with microwave energy of the frequencies absorbed by water molecules disposed in said stretched membrane, subliming said water out of said stretched membrane.

7. The process of claim 6 wherein the further improvement comprises irradiating said frozen water with microwave frequency energy of 2450 MHz frequency and the like frequency absorbed by water molecules, subliming said disposed water out of said stretched membrane.

8. A process useful in increasing the permeability of a thermoplastic composition membrane to waste excreta molecules of human urine, comprising:

stretching a thin membrane of a thermoplastic composition, free of plasticizer, along one to two axes of orientation of said membrane, said membrane being immersed in a water solution bath at a water temperature above room temperature during the stretching step, said water solution bath containing waste excreta crystalline molecules found in human urine, said stretching step reducing the thickness of said thin sheeting from at least a prior 0.015 cm to less than 0.005 cm thickness, said stretched membrane having disposed therein absorbed water and said waste excreta molecules of human urine, maintaining the stretched membrane in said controlled temperature water solution bath for a controlled time period at a temperature providing saturation of the membrane with the water and waste excreta urine solute molecules, removing said stretched membrane from said water bath, and removing excess surface water solution from said stretched membrane, then immediately irradiating said stretched membrane with microwave energy of the frequencies absorbed by the absorbed water molecules in said stretched membrane, providing a more microporous membrane with increased permeability to waste excreta human urine solute molecules found in human urine.

9. A process useful in increasing the permeability of a thermoplastic composition membrane to selected chemical molecules, comprising:

forming a thick wall, small diameter tube by extruding a thermoplastic composition, free of plasticizer, through a tubing die, disposing said tube in a water solution bath having a specific concentration of solvents selected from methanol, ethanol, isopropanol, and acetone, said aqueous solution having a controlled aqueous solution temperature above room temperature, continuously injecting said controlled temperature aqueous solution from said solution bath into the tubing die and then into the plastic tubing interior at a solution volume flow rate cooperating with the plastic tubing formation rate, causing tubing expansion into a thin wall tubing having a wall thickness less than 0.005 cm, as the tubing remains immersed in said solution bath, said tubing expansion controlled to provide a selected outside tubing diameter and thickness, maintaining the stretched membrane in said controlled temperature aqueous solution bath for a controlled time period, at a temperature providing saturation of the membrane with said aqueous solution, removing said stretched membrane from said aqueous solution bath and removing excess surface solution from said stretched membrane, and, irradiating said stretched membrane with microwave energy of the frequencies absorbed by the absorbed solution molecules disposed in said stretched membrane, vaporizing said aqueous solution out of said stretched membrane, providing a more microporous membrane with increased permeability to small molecular weight molecules.

10. The process for increasing the permeability of a thermoplastic composition membrane to the waste excreta molecules in the blood of a uremic patient requiring hemodialysis, the process comprising:

stretching a membrane of thermoplastic composition in an axis, said membrane being immersed in a water bath at a bath temperature not less than equivalent to the glass transition temperature (Tg) of the thermoplastic composition during the stretching step, said stretching step reducing the thickness of said membrane to less than 0.002 cm, aforesaid membrane having absorbed water therein;

immediately after the aforesaid stretching step, subjecting the absorbed water disposed in said stretched membrane to a temperature not more than the freezing point of said absorbed water, freezing the absorbed water disposed in said stretched membrane; and, irradiating aforesaid frozen water in said stretched membrane with microwave energy of frequencies absorbed by the water molecules disposed in said stretched membrane, vaporizing said water molecules out of said stretched membrane, providing a microporous membrane with increased permeability to said waste excreta molecules in the blood of a uremic patient.

11. The process of claim 10 wherein the further improvement comprises irradiating said frozen water with microwave frequency energy of 2450 MHz.

12. A process useful in increasing the permeability of a thermoplastic composition membrane to selected chemical molecules, comprising:

stretching a thin membrane of a thermoplastic composition, free of plasticizer, along one to two axes of orientation of said membrane, said membrane being immersed in a water solution bath containing non-volatile and volatile solute molecules selected from the class consisting of methanol, ethanol, propanol, isopropanol, acetone, sodium chloride, lithium chloride, potassium chloride, sodium carbonate, potassium carbonate, calcium chloride, magnesium sulfate, said water solution bath adaptively adjusted in composition to provide an aqueous soluble solution bath, at a controlled water temperature above room temperature during the stretching step, aforesaid stretching step reducing the thickness of said membrane from at least a prior 0.015 cm to less than 0.005 cm thickness, said stretched membrane having absorbed aforesaid water solution, maintaining the stretched membrane in said controlled temperature water solution bath for a controlled time period, providing saturation of the membrane with said water solution, removing said stretched membrane from said water solution bath, and removing excess surface water solution from said stretched membrane, then immediately irradiating said stretched membrane with microwave energy of the frequencies absorbed by the absorbed water molecules disposed in said stretched membrane, vaporizing said water and any volatile solutes out of said stretched membrane, providing a more microporous membrane with increased permeability to selected chemical molecules.

* * * * *